2,027,873

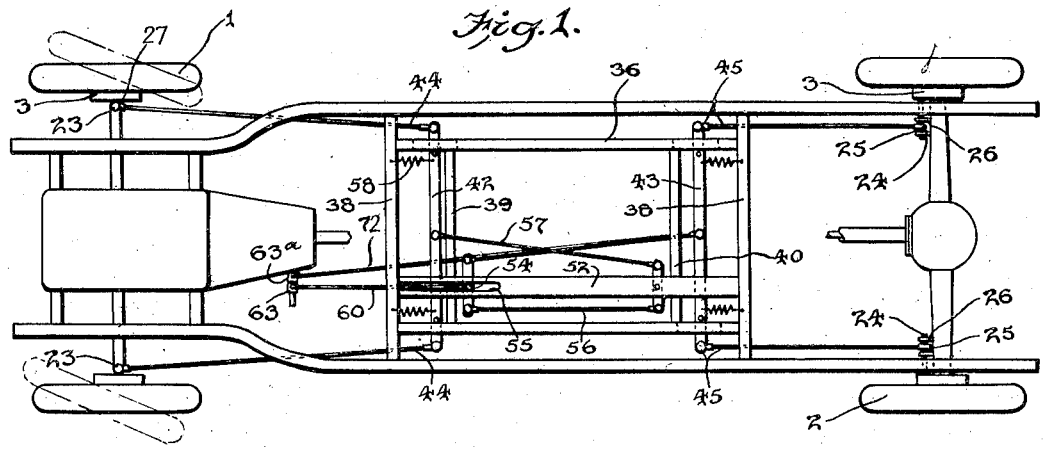
Jan. 14, 1936. J. L. NALL 2,027,873
BRAKE EQUALIZING MECHANISM FOR MOTOR VEHICLES
Filed March 2, 1934 2 Sheets-Sheet 1
Inventor
John L. Nall, Jan. 14, 1936.  J. L. NALL  2,027,873
BRAKE EQUALIZING MECHANISM FOR MOTOR VEHICLES
Filed March 2, 1934  2 Sheets-Sheet 2
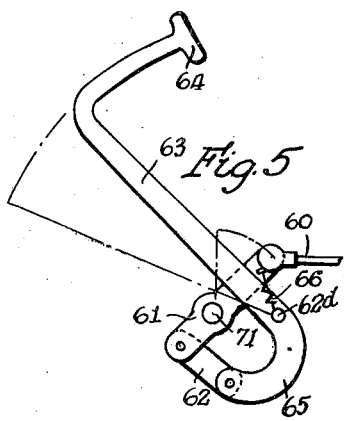
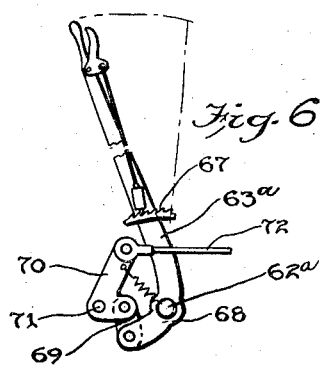
Inventor
John L. Nall,
By Harry F. Riley
Attorney Patented Jan. 14, 1936

UNITED STATES PATENT OFFICE 2,027,873

BRAKE EQUALIZING MECHANISM FOR MOTOR VEHICLES

John L. Nall, Danville, Va.

Application March 2, 1934, Serial No. 713,722

5 Claims. (Cl. 188—204)

The invention relates to brake equalizing mechanism for motor vehicles.

The object of the present invention is to provide simple, practical and efficient brake equalizing mechanism of strong, durable and comparatively inexpensive construction adapted for use on various types of motor vehicles and equipped with means for equalizing the pressure on the brake units of all four wheels of a motor vehicle and of also automatically and simultaneously equalizing the pressure of the brake shoes of each brake unit and of producing uniform pressure on each of the wheels irrespective of the condition of the brake linings of the brake shoes and even should one or more of the brake linings be completely worn away.

A further object of the invention is to provide brake equalizing mechanism of this character mechanical in its connections and operations extending to the brake unit of each of the wheels and capable, should any one of the connections to the brake unit of any one of the wheels become broken or otherwise inoperative, of operating the other brake units and of equalizing the pressure of the same.

It is also an object of the invention to provide mechanical brake equalizing mechanism adapted for use in connection with fluid pressure actuating mechanism and which, should the fluid pressure or similar operating mechanism fail through any reason, will afford mechanical means for applying the brakes and equalizing the pressure of the same.

With the above and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Figure 1 is a plan view of the chassis of a motor vehicle provided with brake equalizing mechanism constructed in accordance with this invention.

Fig. 2 is an enlarged plan view of the equalizing frame illustrating the arrangement of the levers for equalizing the pressure between the brake units of the front and rear wheels.

Fig. 3 is a central longitudinal sectional view of the same.

Fig. 4 is a transverse sectional view on the line 4—4 of Fig. 2.

Fig. 5 is a detail view of the brake operating foot lever.

Fig. 6 is a similar view of the hand lever for operating the brakes of the rear wheels for braking.

The mechanism for equalizing the pressure between the brake units of the front and rear brake wheels comprises in its construction an equalizing frame composed of side frame members 36 of approximately U-shape secured at their terminals in spaced relation with the side members 37 of the chassis of the motor vehicle to transverse chassis members 38 and connected at their ends by transverse frame members 39 and 40. The side members 36 of the equalizing frame are provided with spaced front and rear longitudinal slots 41 slidably receiving front and rear slidable brake equalizing levers 42 and 43 connected respectively with the front and rear brake units by front and rear longitudinal connections 44 and 45 extending from the slidable front and rear equalizing levers 42 and 43 to the operating arms 24 of the transverse rock shafts of the brake units. The connections 44 and 45 between the slidable equalizing levers and the brake units may consist of rods, cables or any other suitable connecting means and the ends of the equalizing levers 42 and 43 extend beyond the frame members 36 and are for the attachment of the connections 44 and 45 and they are provided adjacent the inner faces of the frame members 36 with pins 46 projecting from the upper and lower faces of the levers 42 and 43 and forming stops for retaining the ends of the levers 42 and 43 in the slots 41 of the side members 36 of the frame. The pins forming the stops may be provided with any suitable anti-friction devices if desired and the side members 36 are provided at their inner faces at the slots 41 with sound deadening material 47 consisting of plates or pieces surrounding the slots and adapted to be engaged by the stops 46 of the levers 42 and 43 to prevent noise and rattling and also to eliminate wear.

The equalizing mechanism also comprises front and rear pivoted levers 48 and 49 operating in front and rear horizontal slots 50 and 51 of a longitudinal supporting and guiding member 52 rigidly secured to the front and rear transverse frame members 38. The rear pivoted equalizing lever 49 is mounted on a fixed pivot 53 located between the ends of the slot 51 and suitably mounted on the frame member 52. The front pivoted equalizing lever 48 is slidable in the slot 50 and is provided with a pivot 54 which is slidable in a vertical longitudinal slot 55 of the frame member 52. The pivoted levers 48 and 49 are connected at one end with each other by a connecting rod 56, but a cable of any other suitable form of connecting means may, of course, be employed. The other end of the front pivoted equalizing lever 48 is connected by a flexible connection 56ª with the rear slidable equalizing lever 43 at the center thereof. A cable or any other form of flexible connection may be employed and the corresponding end of the rear pivoted equalizing lever 49 is connected by a flexible connection 57 with the front slidable equalizing lever 42 at the center thereof.

The flexible connections 56ª and 57 are crossed, as shown, and when there is a forward pull on the front pivoted equalizing lever the pull is transmitted through the pivoted and slidable equalizing levers to the brake units and equalized and in the event of the breakage of one of the connections of the slidable equalizing levers the slot adjacent the broken connection will limit the movement of such end of the equalizing lever and the end at the broken connection will fulcrum on the end wall of the slot thereby enabling the equalizing levers to function to equalize the pressure on the brake units other than the one having its connection broken.

The front and rear coiled springs 58 and 59 which are arranged in pairs are connected with the front and rear slidable equalizing levers and with the transverse bearings or members 38 of the chassis for returning the slidable equalizing levers to their initial position after an application of the brake and when the brake is released. The coiled springs 58 and 59 may be connected to any suitable fixed portion and they assist in relieving the brake drums of the brake shoes.

The front pivoted equalizing lever 48 is centrally connected with the rear end of a pull rod 60 or other suitable form of connection which extends forwardly to a pull lever 61 pivoted intermediate of its ends to form upper and lower arms.

The upper arm is connected to the rod 60 and the lower arm is connected by a link 62 with the lower arm of an inclined foot lever 63 fulcrumed on a rod or bolt 62ª on which is also mounted a hand lever 63ª. The foot lever which is provided at its upper end with a pedal 64 of the usual construction, has a lower curved arm or portion 65 to which the link 62 is pivoted, as clearly illustrated in Fig. 5 of the drawings. A retractile spring 66 is connected with the upper arm of the pull lever 61 and with the bolt or rod 62. The foot lever is adapted to be depressed to apply the brakes of the front and rear wheels but any other suitable operating means may of course be employed.

The hand lever which is designed to be operated for parking purposes and which is equipped with a suitable latch mechanism 67 is provided with a lower curved arm 68 connected by a link 69 with one arm of an angle lever 70 fulcrumed on a stud or bolt 71 or other suitable pivot and connected by a rod 72 or other suitable connection with the rear slidable equalizing lever. When the hand lever 63ª is manually operated the brakes of the rear wheels are applied and are adapted to be locked by the latch mechanism 67 in the usual manner.

The front transverse bar 38 of the chassis frame is provided with fixed rearwardly projecting stops 73, one of which, should one of the connections 56 or 56ª of the front equalizing lever 48 break, is adapted to be engaged by the broken or free end of the said lever 48 to form a stop for the same and to enable the lever 48 to fulcrum so that certain of the brake units will at least function and the pressure on the same equalize. While the stops 73 are shown on the transverse chassis member 38 any suitable means may be employed to form a stop and fulcrum for the front pivoted equalizing lever in event of the breakage of one of the connections 56 and 56ª.

The brake units which are applied to the front wheels 1 and the rear wheels 2 form the subject matter of a copending application filed February 4, 1935, Serial No. 4,949, which is a continuation in part of the present application.

What is claimed is:

1. Equalizing mechanism of the class described including front and rear brake units having operating members, an equalizer frame provided with side members having front and rear horizontal slots, front and rear slidable equalizing levers operating in the slots and provided at the inner faces of the side members of the frame with stops for retaining the said levers in the slots, means for connecting the ends of the slidable equalizing levers with the operating members of the brake units, a combined guiding and supporting member carried by the said frame and having a horizontal slot at its rear portion and provided at its front portion with vertical and horizontal slots, a rear pivoted equalizing lever mounted in said rear horizontal slot, a front pivoted and slidable equalizing lever operating in the front horizontal slot and having a pivot slidable in the said vertical slot, means for connecting the pivoted equalizing levers with each other and also with the front and rear slidable equalizing levers, and operating mechanism connected with the front pivoted equalizing lever.

2. Equalizing mechanism of the class described including front and rear brake units having operating members, a supporting frame provided with side members having front and rear horizontal slots, front and rear slidable equalizing levers operating in the slots, means for connecting the ends of the slidable equalizing levers with the operating members of the brake units, a fixed combined guiding and supporting member having a horizontal slot at its rear portion and provided at its front portion with vertical and horizontal slots, a rear pivoted transverse equalizing lever mounted on a fixed pivot in the rear horizontal slot of the guiding and supporting member, a front pivoted and slidable transverse equalizing lever operating in the front horizontal slot and having a pivot slidable in the said vertical slot, means for connecting the pivoted equalizing levers with each other and also with the front and rear slidable equalizing levers, and operating mechanism connected with the front equalizing lever.

3. Equalizing mechanism of the class described including front and rear brake units having operating members, a supporting frame provided with side members having front and rear horizontal slots, front and rear slidable equalizing levers operating in the slots of the side members, means for connecting the ends of the slidable equalizing levers with the operating members of the brake units, a fixed combined guiding and supporting member provided at its front portion with vertical and horizontal slots, a rear pivoted transverse equalizing lever mounted on a fixed pivot on the rear portion of the combined guiding and supporting member, a front pivoted and slidable transverse equalizing lever operating in the front horizontal slot and having a pivot slidable in the said vertical slot, means for connecting the pivoted equalizing levers with each other and also with the front and rear slidable equalizing levers, spaced stops located in advance of the front pivoted equalizing lever and arranged to form a fulcrum for either end of the same should one of the connections of the front equalizing lever break, whereby certain of the brake shoe equalizing means will be rendered operative, and operating mechanism connected with the front pivoted equalizing lever.

4. Equalizing mechanism of the class described including front and rear brake units having operating members, a supporting frame provided at opposite sides with front and rear guiding means, front and rear slidable equalizing levers operating in the said front and rear guiding means, means for connecting the slidable equalizing levers with the operating members of the brake units, a fixed combined guiding and supporting member provided at its front portion with vertical and horizontal guiding means, a rear transverse equalizing lever mounted on a fixed pivot at the rear portion of the guiding and supporting member, a front pivoted and slidable transverse equalizing lever operating in the front horizontal guiding means of the said supporting and guiding member and having a pivot slidable in the vertical guiding means of the guiding and supporting member, means for connecting the pivoted equalizing levers with each other and with the front and rear slidable equalizing levers, spaced stops located in advance of the front equalizing lever and arranged to form a fulcrum for either end of the same should one of the connections of the front equalizing lever break whereby certain of the brake shoe equalizing means will be rendered operative.

5. Equalizing mechanism of the class described including front and rear brake equalizing means having operating members, supporting means including side members having front and rear guiding means and a guiding and supporting member provided at the front with horizontal guiding means and vertical guiding means, front and rear slidable equalizing levers having a limited sliding movement in the guiding means of the side members of the supporting means, a rear pivoted transverse equalizing lever mounted on a fixed pivot at the rear portion of the guiding and supporting member, a front pivoted and slidable transverse equalizing lever operating in the front horizontal guide of the guiding and supporting member and having a pivot slidable in the vertical guide of the guiding and supporting member, said front and rear pivoted equalizing levers extending from opposite sides of the guiding and supporting member, means for connecting the pivoted levers with each other and also with the front and rear slidable equalizing levers, and spaced stops located in advance of the front equalizing lever and arranged to form a fulcrum for either end of the same should one of the connections of the front equalizing lever break whereby certain of the brake shoe equalizing means will be rendered operative.

JOHN L. NALL.